Figure 1:
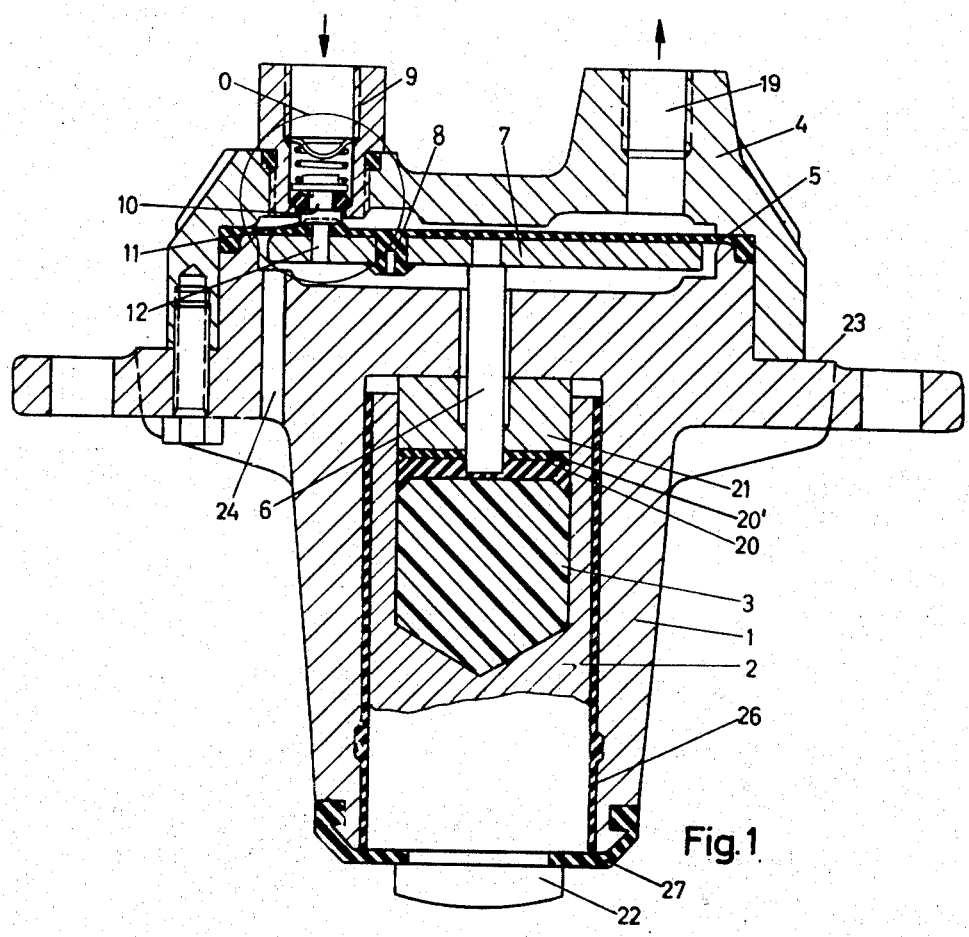

United States Patent [19]

Severinsson

[11] 3,809,110
[45] May 7, 1974

[54] DEVICE FOR PASSING COMPRESSED AIR AT PRESSURES VARYING IN DEPENDENCE UPON FORCES TRANSMITTED THROUGH THE DEVICE

[75] Inventor: Lars Mattis Severinsson, Malmo, Sweden

[73] Assignee: Svenska Aktiebolaget Bromsregulator, Malmo, Sweden

[22] Filed: Nov. 28, 1972

[21] Appl. No.: 310,117

[30] Foreign Application Priority Data
Dec. 4, 1971 Great Britain.................... 56415/71

[52] U.S. Cl............. 137/116.5, 91/433, 137/627.5, 251/57, 303/22 R
[51] Int. Cl............................................. B60t 8/22
[58] Field of Search............ 91/370, 373, 433, 434; 137/85, 116.5, 627.5; 251/57; 267/65 D; 303/22 R

[56] References Cited
UNITED STATES PATENTS
3,107,127  10/1963  Cheveux et al.................. 251/57 X FOREIGN PATENTS OR APPLICATIONS
1,350,030  12/1963  France............................. 303/22 R

*Primary Examiner*—Robert G. Nilson
*Attorney, Agent, or Firm*—Lawrence R. Brown, Esq.

[57] ABSTRACT

A force transmission device for mounting on a vehicle to determine the load has a movable differential piston having a member of smaller diameter including an intermediate deformable medium, connected with a movable member of larger diameter. A valve member connected to a pressure source regulates the pressure in a chamber bearing on the movable member of larger diameter as the position of this member changes thereby causing a greater pressure as the load increases and a lesser pressure as the load decreases. The pressure of this chamber is monitored to operate suitable load responsive devices such as brakes.

12 Claims, 2 Drawing Figures

PATENTED MAY 7 1974 3,809,110

DEVICE FOR PASSING COMPRESSED AIR AT PRESSURES VARYING IN DEPENDENCE UPON FORCES TRANSMITTED THROUGH THE DEVICE

This invention relates to a device of the kind (herein called "the kind defined") which allows compressed air to pass at a pressure varying in dependence upon the magnitude of a force transmitted through the device between two elements (for example two elements in the suspension of a vehicle body) the device comprising a piston (herein called a "differential piston") having a smaller diameter part and a larger diameter part, the smaller diameter part being exposed to the pressure of a plastically deformable body under compression by the force being transmitted through the device, and the larger diameter part of the differential piston being exposed to the pressure of compressed air of which the rates of supply into and escape from the device are regulated in response to axial movements of said differential piston.

Devices of the kind defined are commonly used for govering servo-motors in systems for regulating braking forces to suit the loads on vehicles.

In vehicles there is often little space available for devices of the kind defined and therefore it is an object of the present invention to provide a device of the kind defined which may be of very small exterior dimensions. Also, devices of the kind defined may be kept in use during long periods without maintenance, and therefore it is a further object of the invention to provide a device of the kind defined which will operate satisfactorily without lubrication and cleaning in an unfavourable environment for a long period. Still another object of the invention is to provide a device of the kind defined which is simple and economical to manufacture.

According to the invention there is provided a device of the kind defined characterised in that there is a passage through the larger diameter part of the differential piston and at that side of the differential piston which is exposed to the pressure of the compressed air is a valve member arranged to govern said passage in dependence upon the axial movements of said differential piston and thereby regulate the escape of compressed air from the device through said passage and further to the atmosphere.

Figure 2:
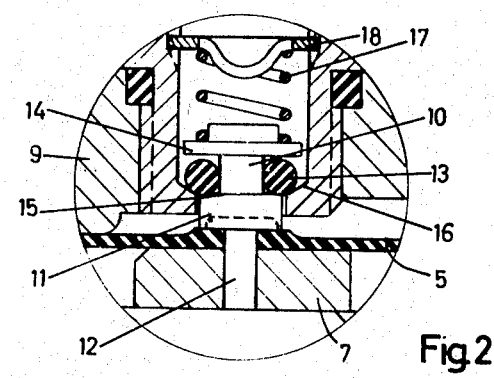

The scope of the monopoly sought is defined in the claims hereinafter, and how the invention may be put into practice is described in more detail with reference to the accompanying drawing, showing in FIG. 1 a vertical section through a device according to the invention in an unloaded condition, and in FIG. 2 an enlarged view of the portion of FIG. 1 within the circle O.

The illustrated device comprises a housing 1 having a substantially cylindrical bore accomodating an axially-movable piston 2. The piston 2 is provided with a bore in which is a body 3 of plastically deformable material, for example polyethylene or silicone rubber. The housing 1 is provided with a cover 4, the margin of a flexible diaphragm 5 being clamped between said housing 1 and the cover 4. The diaphragm 5 forms a part of a differential piston consisting of a smaller diameter piston part 6 rigidly connected to a disc 7 which is attached to the diaphragm 5 by means of rubber rivets 8 vulcanised to the diaphragm 5. The diaphragm 5 acts as the larger diameter part of the differential piston.

The smaller diameter piston part 6 penetrates into the body 3 through a force-transmitting and guiding block 21 above the body 3 in the bore of the piston 2.

The space between the diaphragm 5 and the cover 4 is supplied from a suitable source (not shown) with compressed air which enters the device through an inlet valve housing 9 connected to the cover 4 and containing a valve member 10. The valve member 10 comprises an annular protruding flange 11 adapted to engage the diaphragm 5 around the mouth of a passage 12 extending through the diaphragm 5 and the disc 7.

The space below the diaphragm 5 and the disc 7 communicates with the exterior through an escape passage 24.

A resilient sealing O-ring 13 is mounted, eventually with a small axial play, on the valve member 10 around a neck formed between shoulders 14 and 15 on the valve body. The O-ring 13 is also intended for engagement with an inwardly directed shoulder surface 16 in the valve housing 9.

A compression spring 17 engages the valve body 10 as well as a wire gauze or like filter ring 18 mounted in the valve housing 9. An outlet 19 is adapted to connect the space between the diaphragm 5 and the cover 4 through a hose (not shown) to a servo-motor (not shown).

Between the body 3 and the block 21 there is provided a sealing aggregate consisting of a sealing 20 of a deformable material, such as "Teflon" and a backing ring 20' of a comparatively stiffer material, such as "Delrin." A sleeve 26 of for example "Delrin" is inserted in the bore in the housing 1. A gland 27 is provided at the lower end of the housing to provide for tightness and to loosely hold the piston 2.

The illustrated device is adapted to be subjected to compression and transmit force partly supporting the weight of a vehicle body by contacting one vehicle part with the lower end 22 of the piston 2 and another vehicle part with a flange 23 of the housing 1.

The illustrated device will operate as follows:

Forces are transmitted to the flange 23 from the lower end 22 of the piston 2 through a path including the body 3, the sealing aggregate 20, 20', the block 21 and the housing 1.

The pressure in the material of the body 3 will urge the differential piston part 6 upwards. However, the upwardly-directed force on the piston part 6 will be opposed by a downwardly-directed force on the disc 7 caused by the pressure of the air above the diaphragm 5.

If the force transmitted is increased the piston part 6 and the disc 7 will move upwards thus causing the diaphragm 5 to raise the valve member 10 and consequently the inlet valve opens to establish a connection between the interior of the inlet valve housing 9 and the space above the diaphragm 5. Compressed air from the source (not shown) now enters said space above the diaphragm 5, causing a downward movement of the latter until the inlet valve is closed again. As a result the air pressure above the diaphragm 5 has been increased in proportion to the increase in the transmitted force, and this air pressure is transmitted through the outlet 19 to be used as a signal related to the magnitude of the transmitted force.

If the transmitted force is decreased the piston 6 will move downwards. This will cause a gap between the annular flange 11 on the valve member 10 and the diaphragm 5. The chamber above the diaphragm 5 is thus vented to the atmosphere through the passages 12 and 24. Consequently, as the inlet valve remains closed under the influence of the spring 17, the pressure of the air above the diaphragm 5 is decreased and this permits an upward movement of the differential piston until the diaphragm 5 again contacts the annular flange 11 and thus stops any further escape of air.

As a result the air pressure above the diaphragm 5 will again correspond to the magnitude of the force being transmitted by the device.

I claim:

1. A differential piston arrangement establishing a pressure upon a fluid such as air that varies in dependence upon the magnitude of a force exerted upon the device, comprising in combination, a housing containing a smaller diameter movable member adapted to move therein in response to said force, said smaller diameter member including a body deformable under compression by said force, a larger diameter movable member in said housing, means transmitting said force to said larger diameter member through said deformable body to thereby move it as a function of the magnitude of said force, a pressure chamber within said housing whose volume is changed by movement of said larger diameter member, means including first valve means regulated by movement of said larger diameter member to introduce fluid under pressure into said pressure chamber when the force exerted on said arrangement increases to move the larger diameter member to a predetermined position, further valve means regulating escape of said fluid from said chamber when the force on said arrangement decreases to move the larger diameter member to a predetermined position, and means coupled to said pressure chamber for remotely actuating a device in response to pressure within said chamber.

2. An arrangement as defined in claim 1, wherein said first valve means comprises an axially movable member affixed to said larger diameter member to move therewith.

3. An arrangement as defined in claim 2, including a compression spring, and wherein the axially movable member includes structure holding said compression spring thereon to bias said valve member toward a position permitting said fluid to enter said pressure chamber.

4. An arrangement as defined in claim 1, wherein said larger diameter movable member comprises a flexible diaphragm member.

5. An arrangement as defined in claim 4, wherein said diaphragm defines a passage for permitting escape of said fluid from said chamber therethrough, and said first valve means comprises an axially movable member with a flange thereon for closing said passage.

6. An arrangement as defined in claim 1, wherein said means transmitting said force to said larger diameter member includes a rod of small diameter coupled with said movable member of larger diameter and penetrating said deformable body, and means enclosing said deformable body.

7. An arrangement as defined in claim 6, wherein said means enclosing the deformable body comprises said smaller diameter movable member.

8. An arrangement as defined in claim 7, wherein said means enclosing the deformable body comprises a piston movable within said housing.

9. An arrangement as defined in claim 1, wherein said housing comprises a structure adapted to be bolted in a position on the frame of a vehicle.

10. An arrangement as defined in claim 9, wherein said smaller diameter movable member comprises a piston movable within a cylindrical bore defined by said housing with a portion of the piston extending from the housing to receive a movable force transmitting member in contact therewith.

11. An arrangement as defined in claim 10, wherein said piston comprises a cylinder surrounded by a plastic member.

12. An arrangement as defined in claim 11 wherein said plastic member includes gland structure engaging said piston and said housing.

* * * * *